(12) United States Patent
Deiß et al.

(10) Patent No.: US 12,558,815 B2
(45) Date of Patent: Feb. 24, 2026

(54) METHOD AND DEVICE FOR THE PRODUCTION OF POLYAMIDE 6 PELLETS

(71) Applicant: T.EN ZIMMER GMBH, Frankfurt am Main (DE)

(72) Inventors: Stefan Deiß, Harxheim (DE); Raimund Schwarz, Taunusstein (DE); Karl-Heinz Heldmann, Raunheim (DE); Martin Baumert, Hammersbach (DE); Eva-Maria Kamp, Frankfurt (DE)

(73) Assignee: T.EN ZIMMER GMBH, Frankfurt am Main (DE)

( * ) Notice: Subject to any disclaimer, the term of this patent is extended or adjusted under 35 U.S.C. 154(b) by 181 days.

(21) Appl. No.: 18/277,350

(22) PCT Filed: Feb. 15, 2021

(86) PCT No.: PCT/EP2021/053623
§ 371 (c)(1),
(2) Date: Aug. 15, 2023

(87) PCT Pub. No.: WO2022/171307
PCT Pub. Date: Aug. 18, 2022

(65) Prior Publication Data
US 2024/0131751 A1 Apr. 25, 2024
US 2024/0227243 A9 Jul. 11, 2024

(51) Int. Cl.
*B29B 9/12* (2006.01)
*B29B 9/06* (2006.01)
(Continued)

(52) U.S. Cl.
CPC .................. *B29B 9/12* (2013.01); *B29B 9/10* (2013.01); *B29B 9/16* (2013.01); *B29C 48/0022* (2019.02);
(Continued)

(58) Field of Classification Search
CPC .. B29B 9/06; B29B 9/065; B29B 9/10; B29B 9/16; B29B 2009/168; B29C 48/345
See application file for complete search history.

(56) References Cited

U.S. PATENT DOCUMENTS

| | | | |
|---|---|---|---|
| 6,320,021 B1 | 11/2001 | Hildenbrand et al. | |
| 6,551,087 B1 | 4/2003 | Martin | |

(Continued)

FOREIGN PATENT DOCUMENTS

| | | |
|---|---|---|
| CN | 1319113 A | 10/2001 |
| CN | 101874058 A | 10/2010 |

(Continued)

OTHER PUBLICATIONS

Intellectual Property India, Patent Office, Examination Report issued on Sep. 5, 2024, in corresponding India Patent Application No. 2022/17061557. pp. 1-5.

(Continued)

*Primary Examiner* — Seyed Masoud Malekzadeh
(74) *Attorney, Agent, or Firm* — Troutman Pepper Locke LLP; Gabrielle L. Gelozin

(57) ABSTRACT

A method for the production of polyamide 6 pellets. The method includes, among other things, providing a melt of polyamide 6, feeding the melt into an underwater pelletizing system being operated with a fluid and producing pellets from the melt, transporting the pellets from the underwater pelletizing system with the fluid into an upper side of a vertical vessel having a cylindrical section and a tapered bottom section connected to a pipe comprising a screw and/or a rotary gate valve for conveying the pellets, and extracting of cyclic dimers and oligomers from the pellets, where the fluid is circulated between the underwater pellet-izing system and the vertical vessel wherein a fraction thereof is withdrawn from circulation and the residual amounts of fluid leaving the vertical vessel with the pellets (Continued)

via the pipe and the withdrawn fraction are replenished with fresh fluid.

16 Claims, 5 Drawing Sheets

(51) Int. Cl.

| | | |
|---|---|---|
| *B29B 9/10* | (2006.01) | |
| *B29B 9/16* | (2006.01) | |
| *B29C 48/00* | (2019.01) | |
| *B29K 77/00* | (2006.01) | |
| *C08G 69/16* | (2006.01) | |

(52) U.S. Cl.
CPC ......... *B29B 9/065* (2013.01); *B29B 2009/168* (2013.01); *B29C 2948/92704* (2019.02); *B29K 2077/00* (2013.01); *C08G 69/16* (2013.01)

(56) References Cited

U.S. PATENT DOCUMENTS

| | | | | |
|---|---|---|---|---|
| 8,303,871 | B2 * | 11/2012 | Boothe | ................. B29C 48/919 |
| | | | | 264/142 |
| 8,939,755 | B2 * | 1/2015 | Deiss | ................. B01D 11/0292 |
| | | | | 264/211.13 |
| 9,708,271 | B2 * | 7/2017 | Siebecke | ................. C08G 69/14 |
| 10,584,204 | B2 | 3/2020 | Königsmann | |
| 10,786,928 | B2 * | 9/2020 | Tochihara | ............... B29B 7/429 |
| 2008/0154021 | A1 * | 6/2008 | Jernigan | .................. B01J 19/24 |
| | | | | 528/480 |
| 2014/0243473 | A1 * | 8/2014 | Siebecke | .............. B29C 48/535 |
| | | | | 528/323 |

| | | | |
|---|---|---|---|
| 2016/0009869 | A1 | 1/2016 | Biedasek et al. |
| 2020/0071463 | A1 | 3/2020 | Deiss et al. |
| 2020/0148838 | A1 * | 5/2020 | Christel ................. C08G 63/88 |

FOREIGN PATENT DOCUMENTS

| | | | |
|---|---|---|---|
| CN | 105189608 | A | 12/2015 |
| CN | 209519380 | U | 10/2019 |
| DE | 3710803 | A1 | 10/1988 |
| DE | 19531989 | A1 | 5/1997 |
| DE | 19752182 | A1 | 5/1999 |
| DE | 19752183 | A1 | 5/1999 |
| DE | 10037030 | A1 | 2/2002 |
| EP | 2217638 | B1 | 8/2016 |
| EP | 3650186 | A1 | 5/2020 |
| JP | 2009-535468 | A | 10/2009 |

OTHER PUBLICATIONS

Kun-Chang Lin et al: Experimental analysis of the underwater pelletizing system for producing pellets. <https://researchgate.net/publication/282694711_Experimental_analysis_of_the_underwater_pelletizing_system_for_producing_pellets,> (Jan. 31, 2009).

PCT International Search Report and Written Opinion dated Nov. 15, 2021, issued during the prosecution of corresponding PCT International Patent Application No. PCT/EP2021/053623.

Taiwan Intellectual Property Office, Office Action and Search Report issued on Jun. 7, 2024, in corresponding Taiwan Invention Patent Application No. 111104379.

Dr. W. Alewelt et al., "Technische Thermoplaste Polyamide", Hanser, Dandelon.com; AGI-Information Management Consultants 2008, 22 pages.

Office Action issued on Dec. 29, 2025 in corresponding Chinese Patent Application No. 202180057311.X.

* cited by examiner

METHOD AND DEVICE FOR THE PRODUCTION OF POLYAMIDE 6 PELLETS

CROSS-REFERENCE TO RELATED APPLICATIONS

This application is a U.S. National Stage filed under 35 U.S.C. § 371, based on International PCT Application No. PCT/EP2021/053623, filed on Feb. 15, 2021, in the European Receiving Office. The entire contents of this application is incorporated herein by reference in its entirety.

The present invention relates to a method and a device for the production of polyamide 6 pellets wherein an intermediate drying is not necessary and a combined pelletizing and extraction take place. Depending on the intended use, the pellets may directly be used or subjected to further treatment steps.

PRIOR ART

The method which is mostly used in the large-scale industrial production of polyamide 6 (PA 6) is the ring-opening polymerization of e-caprolactam in the melt with the addition of water. Here, after a sufficient reaction time an equilibrium state is reached in which the PA 6 melt contains around 10% by weight of e-caprolactam. Besides the monomer also appreciable portions of the cyclic dimer as well as the trimer, tetramer, pentamer and hexamer can be found. Depending on the reaction conditions, the content may vary within the range of 7-14% by weight. Before the further processing, they have to be removed, because they deteriorate the polymer properties so dramatically that, for example, a spinning into fibers is not possible at all.

This goal is generally achieved by extraction of the pelletized polymer with water. More recently also hot inert gases have been used for this purpose at the same time combining extraction with a solid state polymerization/polycondensation. An overview over different methods for the production of polyamides and co-polyamides can be found in "Kunststoff-Handbuch", volume 3 "Technische Thermoplaste", sub-volume 4 "Polyamide", edited by G. W. Becker and D. Braun, Hanser-Verlag München and Wien, 1998, pages 22-75. Alternative methods of demonomerization and oligomer removal have been a field of research for long time. However, up to date all of the alternatives either do not reach the levels of extraction required for demanding uses or are associated with other severe disadvantages like often clogged apparatuses, low throughput, expensive devices, or fault-prone processes.

As a consequence, the wet extraction process with hot water is still the almost exclusively used method in the industry. For that purpose the polymerized PA 6 melt is processed into pellets which then are extracted in counter-current or co-current with water in extraction processes with residence times of several hours. From the large amounts of extract water resulting from these processes the e-caprolactam has to be recovered in a laborious manner by evaporation of the contained water. This concentration process requires a considerable amount of energy since an amount of water in the range of up to several tons per hour has to be evaporated. Further, correspondingly large evaporators are required in order to cope with the amount of extraction fluid which results in spacious plant designs.

In the underwater pelletization stage the temperature of the process fluid, which usually is water, is commonly in the range of about 70° C. to about 99° C., i.e. below the boiling point of water, in order to avoid an increased pressure in the underwater pelletizing system. If the temperature is raised further, quickly a very high system pressure occurs which can be up to 15 bar and is difficult to handle. Since a content of about 4% by weight of extractables in the pelletization water raises its boiling point, also some degrees above 100° C. are possible without increased pressure.

EP 2 217 638 B1 discloses an improved extraction process for PA 6 pellets wherein for the underwater pelletization and an extraction device following thereafter the same process fluid is used. The process fluid is particularly preferred of a composition which corresponds to the composition after the extraction. Usually, water is used as the process fluid and during extraction the concentration of low molecular extract in the extraction water is adjusted to about 10% by weight. However, in the underwater pelletization a concentration of not more than 4% by weight is maintained since a higher amount of extractables in the water causes excessive foaming so the cleansing of the granules and therefore the whole process is impeded. On the other hand, introducing the pelletization water with its 4% by weight of extractables into the extraction would result in a considerable lowering of the concentration of extractables from the normal about 10% by weight.

In order to solve this problem of excessive foaming, EP 2 217 638 B1 proposes the application of an increased pressure in the underwater pelletization stage. Preferably, the pressure is ≥4 bar. A special temperature of the process fluid is not mentioned and will, hence, be in the common range of about 70° C. to about 99° C. mentioned above. This effectively prevents foaming and consequently allows using a concentration of extractables of about 10% by weight throughout pelletization and extraction and creation of a double loop closed circuit between underwater pelletization and extraction. At the same time a dryer before the extraction can be spared because the process fluid is the same in both stages. Therefore, the overall process is more economic and faster.

However, for a solid state polymerization this process requires a process step following thereafter which optimizes the crystallinity or the crystal structure, respectively, and a step for increasing the molecular weight of the polyamide to practicable values for further uses. If the pellets have not been exposed to a certain temperature in order to optimize the crystallization (e.g. binding of loose chains to the crystals, recrystallization) they will stick together during a solid state polymerization/polycondensation. Further, the process does not specifically target the particularly critical cyclic dimers during extraction. The focus is not the required residual extractables concentration in the pellets but the possibility to extract the monomer and oligomeric extractables in general and to reintroduce them into the polymerization without having to cope with huge amounts of water to be removed and further to match the concentration of the ε-caprolactam in the total process.

Patent application DE 37 10 803 A1 discloses a method for extracting e-caprolactam and its oligomers from polyamide pellets by means of superheated water steam. In this method, during extraction also an increase in molecular weight is achieved. Polyamide pellets are introduced into a treatment zone from above with a temperature of at least 100° C. and slowly moved downward through the treatment zone heating them up to 130° C. to 210° C. by means of superheated water vapor of a temperature of 130° C. to 210° C. flowing counter currently through the treatment zone. At the bottom of the treatment zone extracted and molecular weight increased dry pellets can be removed while the steam exiting at the top containing the e-caprolactam and its oligomers is fed to a distillation column, for example a bubble cap tray column or sieve tray column, for further separation. The residence time in the treatment zone is about 20 to 60 hours. When compared with the classic water extraction, a considerably lower amount of water has to be dealt with during cleansing and recirculation. However, the water has to be heated to much higher temperatures in order to produce the superheated steam.

Further, also this method does not specifically address the cyclic dimers and the pellets to be fed into the treatment zone have to have a defined raised temperature. Moreover, the pellets require a special temperature treatment/recrystallization in order not to stick together. In the state of the art procedure, the temperature gradient in the treatment zone has to be controlled very precisely and the temperature has to be raised very slowly. The latter results in a decreased throughput and higher process costs.

DE 100 37 030 A1 discloses a method for the production of polyamides wherein the monomers are polymerized under a water vapor pressure of at least 3 bar abs., preferably about 6 bar abs., and pelletization is performed in a liquid under a hydraulic pressure of at least 3 bar abs., preferably about 7 bar abs. The object of this application has been the reduction of dirt particles in the melt and pellets, respectively. These dirt particles can occur during removal of the reaction water from the polymerization in the degassing extruders. During this process, coatings and encrustations are formed on the extruder walls which are constantly rinsed by the melt and carried away. If these come into contact with oxygen, they rapidly turn black and deteriorate the look and mechanical properties of the polymer. The inventors have found out that a pressure of at least 3 bar abs. is required in the polymerization stage in order to avoid the formation of dirt particles.

The pelletization is preferably performed in water at a temperature of 20° C. to 95° C., particularly preferred 50° C. The residence time in the pelletization bath is preferably 0.1 s to 4 min, particularly preferred 1 s to 40 s. The liquid is recirculated after separation from the pellets and the pellets are either dried or used still humid on the surface. The final step is a post-polymerization of the pellets wherein the pellets are heated for 2 to 24 h to a temperature of preferably between 150° C. and 30° C. below the melting temperature.

The examples demonstrate that it is essential that the pressure in the polymerization is at least 3 bar abs. in order to achieve low dirt values and that the pressure in the pelletization is at least 3 bar abs. in order to be able to produce uniform pellets or pellets at all. However, there is no reference made to an effect on the extraction of e-caprolactam and its oligomers in general or cyclic dimers in particular. The reason for the increased pressure in the underwater pelletization is simply that the melt, when polymerized under an increased pressure in order to avoid the formation of dirt particles, cannot be formed into pellets of the required quality. Only if the pressure after the die of the extruder is about equal or a little higher than in the polymerization, usable pellets can be produced.

A method for the extraction of polyamide pellets specifically addressing the dimer content of the pellets is disclosed in DE 197 52 182 A1. The method comprises two extraction zones wherein in the first zone a reduction predominantly of the cyclic dimers is achieved by extraction at a temperature of 100° C. to 140° C. with an aqueous e-caprolactam solution of 15% to 40% by weight. In the second zone an extraction at a 5° C. to 40° C. lower temperature with water is made. The overall extraction time is 5 to 20 hours. The application particularly mentions that by the addition of the e-caprolactam to the extract water in the first zone a stabilizing effect is achieved which allows a concentration of up to 6% by weight of oligomers in the extract water without troublesome sedimentations in its further treatment.

This process works with pellets which are directly fed from the pelletization into the first extraction zone after removal of the transport water by a suitable separation device. Therefore, it is a classic two-stage procedure with pellets which requires an intermediate drying in order to have a constant low concentration of water in the pellets and no diluting effect on the extraction fluid. Drying is usually performed using for example centrifugal dryers until a level of below 1% by weight of water before entry of the extraction stage is achieved. This water content comprises water taken up by the pellets as well as residual surface water.

All these processes show the disadvantage that cyclic dimers cannot be reduced quickly, i.e. only with a lot of effort. In addition, the wet extraction processes still contain a lot of extraction water. In order to recover the extracts, with the aim of returning them to the polymerization process, the extract must be concentrated by evaporation beforehand with high energy consumption. Further, many of the processes are struggling with the formation of excessive foam in the underwater pelletization and/or the extraction when trying to increase the content of extractables in the operation fluids. This occurs particularly in connection with pressurized systems.

The complex conventional wet extraction processes with classical pre-extraction of the cyclic dimers represent an enormous cost factor in the overall process in polyamide 6 production. It is therefore of particular importance to make the overall extraction process, including the pre-extraction of cyclic dimers, more cost-effective while maintaining or even improving product properties.

Object

It was the object of the present invention to provide a novel method and a novel device which do not suffer from the above-described prior art disadvantages. A particular object was that the method results in pellets with low residual amounts of cyclic dimers, and a recrystallization which allows the direct usage in a solid state polymerization/polycondensation method, in particular avoiding the need for a slow heating rate of the pellets. Further, it was the aim to guarantee a higher cost effectiveness and less process steps in comparison to the standard wet extraction process.

DESCRIPTION OF THE INVENTION

The object of the invention is achieved by a method and device according to the independent claims. Advantageous embodiments are subject of the dependent claims.

In the context of this application, the term "polyamide 6" or "PA 6" is to be understood as comprising also copolymers of PA 6, like PA 6/66.

Further, if in the context of this application a "temperature gradient" is described it does not necessarily mean a steady change of temperature. Instead, it is predominantly referring to a sequence of temperature zones of successively increasing or decreasing temperature.

A method according to the invention for the production of polyamide 6 pellets comprises the steps of
  a) providing a melt of polyamide 6;
  b) feeding the melt into an underwater pelletizing system being operated with a fluid and producing pellets from the melt;

c) transporting the pellets from the underwater pelletizing system with the fluid into an upper side of a vertical vessel having a cylindrical section and a tapered bottom section connected to a pipe comprising a screw and/or a rotary gate valve for conveying the pellets;

d) extraction of cyclic dimers and oligomers from the pellets;

wherein step d) takes place in the underwater pelletizing system, after sedimentation by gravity into the tapered bottom section of the vertical vessel, the pellets together with residual amounts of the fluid are conveyed by the screw and/or the rotary gate valve through the pipe from the vertical vessel;

the fluid in the underwater pelletizing system and the vertical vessel comprises an aqueous solution of ε-caprolactam, the fluid in the underwater pelletizing system is held at a temperature between $T_g + x \cdot (T_m - T_g)$ and $y \cdot T_m$, wherein $T_g$ and $T_m$ are the glass transition temperature and the melting temperature of the polyamide 6, $x = 0.5$-$0.8$ and $y = 0.95$-$1.0$, the tapered bottom section of the vertical vessel is cooled, a pressure between 4 bar and 12 bar is maintained in the underwater pelletizing system and the vertical vessel, and the fluid is circulated between the underwater pelletizing system and the vertical vessel wherein a fraction thereof is withdrawn from circulation and the residual amounts of fluid leaving the vertical vessel with the pellets via the pipe and the withdrawn fraction are replenished with fresh fluid.

In the context of this application, a "cylindrical" section is understood as a section in the form of the mathematic definition of a general cylinder, in particular a general straight cylinder, wherein the definition explicitly includes the special shapes of the prism, in particular the straight prism, and the cuboid. Preferably, it is a straight circular cylinder or a straight prism with hexagonal to icositetragonal base areas.

Depending on the shape of the cylindrical section of the vertical vessel, the tapered bottom section may for example be of a conical shape, a semispherical shape, pyramidal shape, or an equivalent shape promoting collection of the sedimented pellets around the screw and/or rotary gate valve. It is most preferably of a conical shape.

Preferred embodiments of the method further comprise a step e) of feeding the extracted pellets into a further processing. The further processing may, for example, comprise an extraction of monomer and oligomers, method steps for increasing the molecular weight of the polymer, such as a solid state polymerization, and/or the direct use for the production of shaped articles or films, or spinning into textile fibers and/or filaments. A particularly preferred embodiment comprises as further processing in step e) drying, extraction of ε-caprolactam and oligomers, and/or solid state polymerization/polycondensation.

The pellets are conveyed by the screw and/or the rotary gate valve through the pipe from the vertical vessel. If a single rotary gate valve is insufficient for reducing the pressure, two or three of them may be used consecutively for stepwise reducing the pressure. In cases where in a direct process as the next step a final wet extraction step immediately follows, a single or double rotary gate valve is one of the useful options. If the process is conducted as a two-step process involving alternative secondary extraction steps, such as a vacuum extraction, an extraction with superheated steam, or an extraction with inert gas, the pellets will be transported from the end of the pipe by means of an extruder or an additional rotary gate valve to the next process step. I.e., the device will comprise a screw or a single or multiple rotary gate valve at the upper end of the pipe for pressure separation and reduction and an extruder or an additional rotary gate valve at the lower end of the pipe for transporting the pellets to the next process step.

The pressure in the underwater pelletizing system and the vertical vessel is according to the invention maintained between 4 bar and 12 bar, preferably between 4.5 bar and 11 bar, more preferably between 5 bar and 10 bar, more preferably between 5.5 bar and 9.5 bar.

The pellets sediment by gravity into the conical section of the vertical vessel. The time required for falling through the cylindrical section of the vessel filled with fluid is about 10 s to 30 s, depending on the density of the polymer, the concentration of the fluid, the size of the pellets, and the size of the vessel. The process conditions are during this normal operation adjusted such that the pellet level is located within the tapered bottom section of the vertical vessel. Since the tapered bottom section and the fluid therein is cooled, the pellets are solidified and partially crystallize, which will prevent them from sticking together.

The temperature at which the fluid is held according to the invention is a temperature between $T_g + x \cdot (T_m - T_g)$ and $y \cdot T_m$, wherein $T_g$ and $T_m$ are the glass transition temperature and the melting temperature of the polyamide 6. The factors x and y in this formula are $x = 0.5$-$0.8$ and $y = 0.95$-$1.0$. Preferably the factor $x = 0.55$-$0.75$, more preferably $x = 0.6$-$0.7$. Preferably the factor $y = 0.96$-$0.99$, more preferably $y = 0.97$-$0.98$. A preferred combination of x and y is $x = 0.6$ and $y = 0.99$, more preferred $x = 0.7$ and $y = 0.98$.

By adjusting the temperature of the fluid in the underwater pelletizing system in said range, the pellets are kept liquid or glassy throughout the extraction procedure. In other words, this means that the temperature of the fluid is controlled to be in a range starting 50% to 80% of the difference between the glass transition temperature and the melting temperature above the glass transition temperature and ending at 95% to 100% of the melting temperature for ascertaining a liquid or glassy polymer throughout the underwater pelletizing system. This takes into account the different polymers of polyamide 6 and copolymers thereof and their respective thermal properties. For example, a polyamide 6 homopolymer can be held at a temperature between 150° C. and 210° C., preferably between 160° C. and 210° C., more preferably between 170° C. and 210° C., more preferably between 180° C. and 200° C. Hence, the viscosity of the pellets is in the order of several magnitudes lower than that of a solid pellet as used in the common wet extraction process. This means also that the diffusion processes within the still liquid or glassy pellet are in the order of several magnitudes faster than in the solid pellet. Hence, a dramatically shorter extraction time is required. The residence time in the underwater pelletizing system which already comprises extraction of cyclic dimers and oligomers can be kept under five minutes.

When compared with a standard underwater pelletizing system, where residence times are commonly about 15-20 s, this time is a little bit longer, but it already includes the time required in the state of the art for an intermediate drying and the pre-extraction stage for cyclic dimers. Hence, the process time for both stages is drastically reduced and the intermediate drying can be spared. This results in faster production, less apparatus costs, less space requirement, and considerably less energy costs. Regarding the energy costs, important factors are not only that the dryer can be spared but also that the amount of water which usually has to be evaporated when recovering the extracts for re-use in the polymerization is reduced since the whole pre-extraction stage can be skipped.

In preferred embodiments, cooling of the tapered bottom section of the vertical vessel is effected by an external cooling jacket and/or injecting a cooling liquid. Particularly preferred, cooling is effected by injecting a cooling liquid into the tapered bottom section of the vertical vessel. This embodiment allows for a very effective cooling of the section since the pellets in the conus prevent enhancing convection of the fluid by stirring. Hence, depending on process conditions a cooling jacket alone may prove itself insufficient for cooling the pellets within the fluid to the required temperature. Most preferably, the cooling liquid which has been injected in the tapered bottom section is also withdrawn from the tapered bottom section. The injected cooling liquid may be withdrawn from the tapered bottom section through mesh or sieve inserts installed into the wall of the tapered bottom section preventing the pellets from being withdrawn but allowing the cooling liquid to exit. This "looping" of the cooling liquid within the tapered bottom section ascertains that there is only a minimal exchange with the warmer fluid in the cylindrical section of the vertical vessel and avoids turbulences in the section where the pellets are falling through.

The fluid within the vertical vessel should be kept moving as laminar as possible in order to maintain clearly separated temperature zones and to avoid swirling the falling pellets. This essentially serves two purposes. One is to give the pellets sufficient time at the high temperature part of the crystallization to acquire the desired level of optimized crystallinity. And the other one is to quickly quench the pellets within the cool tapered bottom section in order to be able to discharge them without sticking or deformation. Hence, when injecting a cooling liquid into the tapered bottom section this should be made with only a slight overpressure just to compensate the back pressure and at several places or circumferential instead of using a strong jet at a single place. Also the cylindrical section of the vertical vessel and particularly its upper part with the inlet of the fluid/pellet stream from the underwater pelletizing system has to be suitably designed.

For both of these embodiments, it is preferred to select the cooling liquid from the group consisting of water, an aqueous solution of ε-caprolactam, and ε-caprolactam. Particularly preferred is an aqueous solution of ε-caprolactam. However, operating the cooling at least part time with pure water or ε-caprolactam can be used as a further means for introducing fresh fluid and adjusting the concentration of the fluid within the vertical vessel. This effectively means that the whole process is conducted with a single fluid. Preferably, the cooling liquid is taken from a final extraction step which may follow the present pre-extraction. Such a final extraction step is usually conducted at a temperature of between 110° C. and 120° C. at the bottom of the extraction vessel since the pressure created by the water column/liquid height within the vessel allows this temperature without boiling of the water.

Preferably, the residence time in the underwater pelletizing system is ≤5 min. More preferably, the residence time is ≤4 min, more preferably ≤3 min, more preferably ≤2 min, more preferably ≤1 min. The residence time can be at least 15 s, preferably at least 30 s. Preferably, the residence time is between 15 s and 5 min, more preferably between 30 s and 4 min, more preferably between 30 s and 3 min, more preferably between 30 s and 2 min, more preferably between 30 s and 1 min.

Optionally, the extraction of step d) is continued in the vertical vessel. This option is an additional variant which is particularly relevant if the residence time in the underwater pelletizing system is insufficient for recrystallization or extraction, for example in cases when the temperature of the melt and/or the aqueous solution of ε-caprolactam had to be lowered due to operating troubles. Like mentioned above, the time the pellets spend in the cylindrical section of the vertical vessel while sedimenting is from about 10 s to 30 s. During this short time, practically no extraction will occur. In order to achieve this further oligomer extraction in the vertical vessel, the vertical vessel is provided with an additional inlet for an aqueous solution of ε-caprolactam in the lower part of the cylindrical section, preferably in its lower half, more preferably in its lower third. There, an aqueous solution of ε-caprolactam is introduced into the lower part of the cylindrical section at a temperature above that of the liquid in the tapered bottom section and up to the temperature used in the underwater pelletizing system thereby creating a temperature gradient in the vertical vessel. Preferably, the temperature is between 130° C. and 180° C., more preferably the temperature is between 140° C. and 170° C. As this additional aqueous solution of ε-caprolactam has a higher temperature than the coolant from a final extraction or an external source, it does not (primarily) mix with the coolant and, therefore, can additionally contribute to extraction. This way a temperature gradient is created in the vertical vessel comprising three zones, a cold zone in the tapered bottom section, a hot zone in the upper part of the cylindrical section where the hot pellets and fluid enter the vertical vessel from the underwater pelletizing system, and an intermediate zone in-between them around the transition area from the cylindrical to the conical part. In such an embodiment, the pellet level is located above the tapered bottom section. The pellets are only being extracted while residing above the tapered bottom section. Once they have moved further downwards into the cooled tapered bottom section on their way to the exit of the vertical vessel, the extraction will virtually stop.

In embodiments, the aqueous solution of ε-caprolactam comprises an ε-caprolactam content of between 40% by weight and 80% by weight, preferably between 45% by weight and 75% by weight, more preferably between 50% by weight and 70% by weight, most preferably between 55% by weight and 65% by weight. As opposed to an ε-caprolactam content of about 4% by weight, which accumulates during a normal underwater pelletization in the pelletization water, such a high ε-caprolactam content significantly increases the extraction of cyclic dimers. The inventors have found that in the method according to the invention there is an optimum of the extraction at about 60% by weight.

Preferably, in the underwater pelletizing system a weight ratio of the fluid to the pellets of between 1:1 and 3:1 is used, more preferably of between 1:1 and 2.5:1, more preferably of between 1:1 and 2:1, more preferably of between 1:1 and 1.5:1, more preferably of between 1:1 and 1.25:1. As it is an object of the invention to reduce the amount of fluid, particularly of water, which has to be evaporated and worked up later on in the process as far as possible, the pellet concentration in the bath is set as high as possible. Limiting factors are the extraction (solubility limit dependent on the bath temperature) and the risk of the liquid or glassy pellets sticking together. Hence, there has to be sufficient fluid in order to dissolve the cyclic dimers and for separating the pellets. However, in the vertical vessel, and particularly in its tapered bottom section, the weight ratio of the fluid to the pellets may be below 1. For example, a ratio of 0.8:1 has been found to be practical.

In preferred embodiments, ε-caprolactam or an aqueous solution of ε-caprolactam are mixed into the melt before entering the underwater pelletizing system. Since the melt in a polymerization device, for example a VK tube, already contains a considerable amount of water, using pure ε-caprolactam is more preferred for these cases. The ε-caprolactam or solution can be injected into the melt and mixed. Depending on the type of device used for providing the polyimide 6 melt, this can be done in the melt pump at the end of a VK tube, where polymerization takes place, or in the end zone of an extruder melting pellets to be extracted. This has been found to be improving the extraction speed and/or achieved levels of concentration of cyclic dimers. It can be assumed that this effect is caused by the fact that ε-caprolactam (or its solution) is already present in the core of the pellets when they are created, i.e. the ε-caprolactam solution does not have to diffuse from outside into the pellet before it can extract the cyclic dimers.

In preferred embodiments, water and/or ε-caprolactam is dosed into the fluid between the vertical vessel and the underwater pelletizing system for maintaining a constant concentration of the fluid. Additionally to this, a certain amount of the extract loaded fluid is withdrawn from circulation in order to avoid accumulation of the extracts in the loop.

In a further embodiment, the screw does not extend through the full length of the pipe and water is pumped counter currently to the pellets into the pipe and withdrawn at a point below the screw. The cold water fed from below into the pipe will then remove ε-caprolactam adhering to the surface of the pellets. Such a cleansing action is necessary if the vertical vessel is not directly connected to a wet extraction, but the pellets are prepared for alternative further processes, such as a vacuum extraction, an extraction with superheated steam, or an extraction with inert gas. The superficial ε-caprolactam would then cause that the pellets stick together.

For this purpose, the pipe may be provided with sieves adjacent to the tip of the screw. All screens are required to ensure that only water or aqueous solution is discharged, but no pellets.

In preferred embodiments, the pipe is at least partially cooled. In particular, the surface around the screw is cooled if not the whole pipe is cooled. Due to a narrow gap between the screw and the pipe of e.g. half a pellet diameter and the length of the screw in connection with this optional external cooling of the pipe, the vertical vessel is decoupled from a downstream further processing step like a final extraction in terms of pressure and temperature.

Preferably, the pipe is cooled to a temperature of between 5° C. and 100° C., more preferred of between 10° C. and 80° C., more preferred of between 20° C. and 60° C., more preferred of between 25° C. and 50° C., more preferred of between 30° C. and 40° C., more preferred of between 30° C. and 35° C. Upon cooling, the aqueous ε-caprolactam solution in the area of the screw shows an increased density, which additionally promotes the decoupling of the pre-extraction according to the invention from a further processing step. This acts as an additional resistance or additional seal against push through of pellets in the peripheral area into the further processing like a final wet extraction step.

A particularly preferred device for the production of polyamide 6 pellets comprises means for providing a melt of polyamide 6;

an underwater pelletizing system which is operable under increased pressure;

a vertical vessel having a cylindrical section and a tapered bottom section, wherein the tapered bottom section is provided with cooling means and is connected to a pipe comprising a screw and/or a rotary gate valve for conveying pellets; and a circuit for circulating an aqueous solution of ε-caprolactam through the underwater pelletizing system and the vertical vessel.

Preferably, the cooling means of the tapered bottom section of the vertical vessel comprise an external cooling jacket and/or one or more inlets for a cooling liquid. These inlets for a cooling liquid may comprise single nozzles or a ring of nozzles or a sieve or mesh structure which preferably are of a circumferential design. They may be arranged in single or multiple heights of the tapered bottom section. A special embodiment may combine the external cooling jacket with the inlets by designing the wall of the tapered bottom section as a hollow wall with a perforated inner wall and a solid outer wall.

In embodiments, the screw does not extend through the full length of the pipe, the end of the screwless pipe section distal to the screw is provided with means for pumping water through the pipe towards the screw, and the end of the screwless pipe section proximal to the screw is provided with means for withdrawing water. Preferably, the means for withdrawing water comprise sieves which are installed in the wall of the pipe adjacent to the tip of the screw, like mentioned above.

In preferred embodiments, the pipe is cooled at least partially in the section containing the screw by means of a cooling jacket. Due to the gap between the screw and the pipe of e.g. half a pellet diameter, the length of the screw, etc. in connection with the cooling of the pipe, the vertical vessel is decoupled from a final extraction regarding pressure and temperature. The cooling of the aqueous solution of ε-caprolactam within the screw section causes an increased density of the solution, which additionally promotes the decoupling of the systems.

In further preferred embodiments, a lower section of the cylindrical section of the vertical vessel is provided with an inlet for an aqueous solution of ε-caprolactam. This inlet is, as described above, then used for feeding a hot aqueous solution of ε-caprolactam into the vertical vessel in order to conduct a further extraction of the pellets. It may be installed as a failsafe option for operating troubles in the melt providing device or the underwater pelletizing system.

DESCRIPTION OF THE FIGURES

In the following, the invention is described by means of exemplary figures. They are provided only for illustrating the invention, and they should not be construed as limiting.

Figure 1:
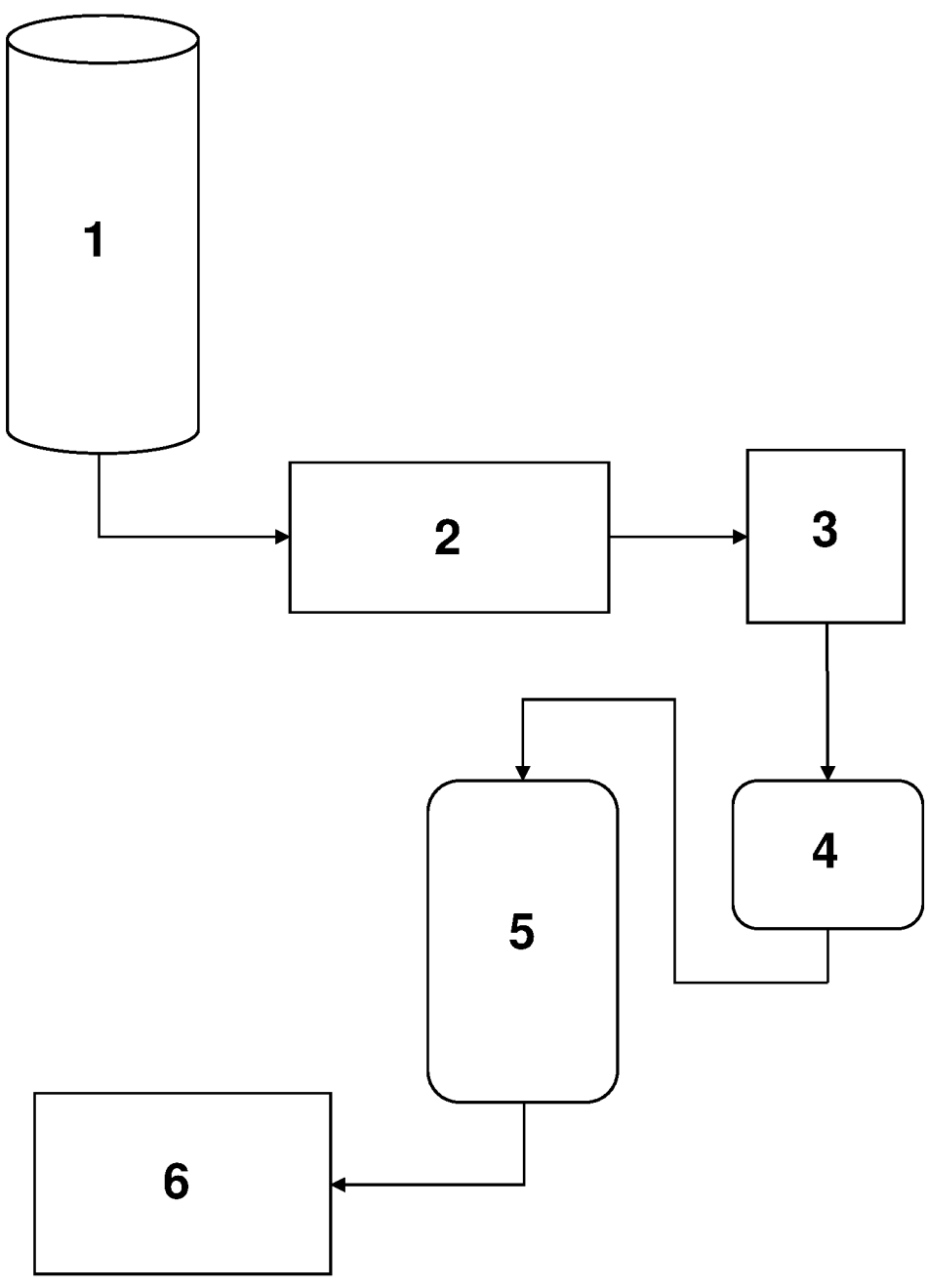
FIG. 1 shows a scheme of a process according to the prior art.

In FIG. 1, a schematic drawing of an example of a process according to the prior art is shown. The monomers are typically polymerized in a VK tube (1) optionally preceded by a pre-polymerization step at increased pressure (not shown in the figure). From here, the melt, which has a temperature in the range of about 220° C. to 245° C. (depending on the type of polyamide or copolyamide), is conducted to an underwater pelletizing system (2) where the melt is extruded into a water bath typically having a temperature of about 70° C. to 99° C. The residence time in the water bath is normally in a timeframe of seconds to single digit minutes.

The pellets are then transported by water into a dryer (3). This dryer (3) may have different designs depending on the amount of drying required. If the pellets have not absorbed much water, the dryer (3) may for example be a centrifuge or sieve (optionally operated with hot gases, particularly inert gases like nitrogen) essentially removing the surface water from the pellets. However, if the water content of the pellets is too high, a drying device employing increased temperature and gas rinsing is required. Typically, the pellets are brought to a residual water content of about 1% by weight before they are entered into the pre-extraction stage for cyclic dimers (4). This is required since every additional water carried over from the pelletizing step into the extraction step will later on have to be removed by evaporation from the extraction fluid before recycling it into the polymerization.

At least the residual monomer and oligomers content has to be reduced in order to produce a usable polymer. This is done in extraction stage (5). However, as the content of cyclic dimers is particularly critical for pellets which are going to be used for spinning into textile fibers and/or filaments, nowadays almost all plants are equipped with a pre-extraction stage for cyclic dimers (4) located upstream of the extraction stage (5) in order to specifically decrease in a first step the concentration of the cyclic dimers to a level suitable for these demanding applications. The overall residence time in such a combined pre-extraction/extraction stage is usually about 18 to 24 hours.

After the extraction, the pellets are fed to a further processing (6) after a (further) drying step as required. The further processing may comprise method steps for increasing the molecular weight of the polymer, such as a solid state polymerization, or the direct use for the production of shaped articles or films, or spinning into textile fibers and/or filaments.

Figure 2:
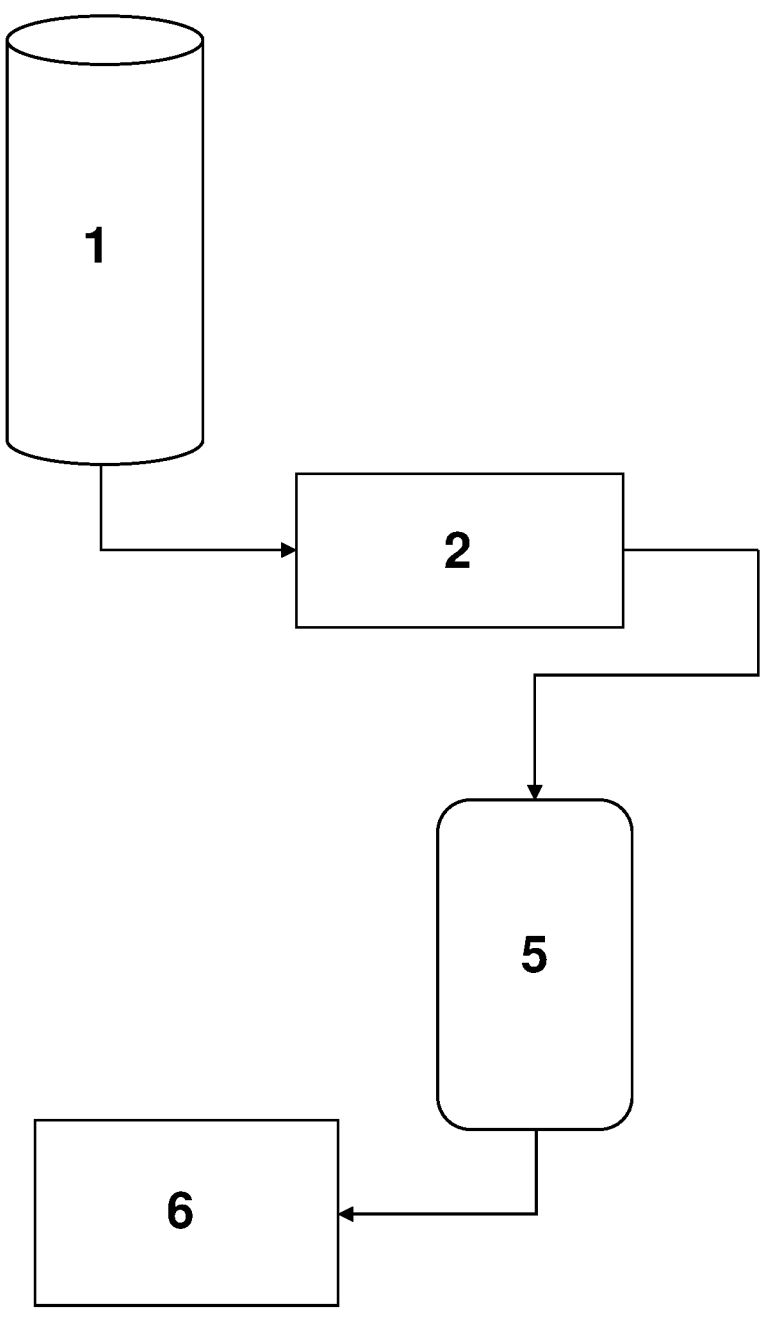
FIG. 2 shows a scheme of a process according to the invention.

In FIG. 2, a schematic drawing of an example of a process according to the invention is shown. It can be seen at first glance that, when compared with the prior art process of FIG. 1, the process according to the invention does not need a dryer (3) and a pre-extraction stage for cyclic dimers (4). Hence, the plant can have a more compact layout. In this example process, the melt is provided by a VK tube (1) in which ε-caprolactam is polymerized. In other embodiments, instead of VK tube (1) a simple extruder can be used for provision of the melt in cases where unextracted pellets are to be extracted.

The melt is extruded into an underwater pelletizing system (2) which is operated with a fluid comprising an aqueous ε-caprolactam solution with an ε-caprolactam content of between 40% by weight and 80% by weight. There, the melt is pelletized and cyclic dimers and oligomers are extracted from the pellets by the fluid. The pressure in the underwater pelletizing system (2) is maintained between 4 bar and 12 bar.

As shown in FIG. 2, in some embodiments, like in prior art, an extraction stage (5) for reduction of the residual monomer and oligomers content can follow and thereafter a further processing (6). In other embodiments, the extraction stage (5) can be spared and instead the further processing (6) can be a combined extraction and solid state polymerization, where after an intermediate drying the pellets are heated with hot vapors or gases which cause the evaporation of the residual monomer and oligomers and polymerization at the same time.

EXAMPLES

Figure 3:
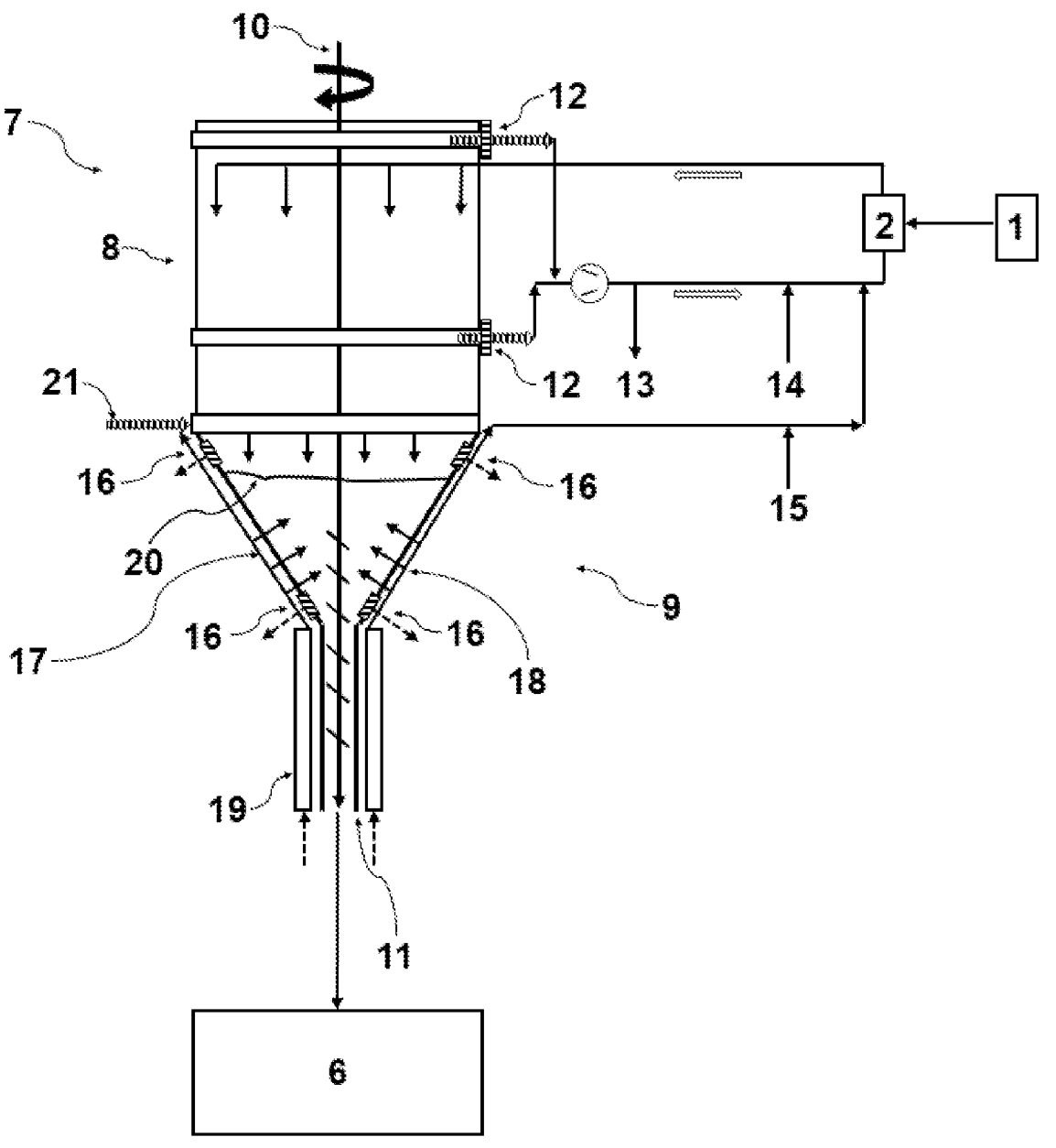
FIG. 3 shows a scheme of a process and device according to the invention.

An example of a process and device according to an embodiment of the present invention is shown in FIG. 3. It is the most basic layout of the process.

A PA6 melt is provided by a VK tube (1) to an underwater pelletizing system (2) for cutting into pellets. The melt temperature is set to a temperature of between 230° C. and 260° C., preferably about 245° C. The cutting chamber in the underwater pelletizing system (2) is supplied with a fluid comprising an aqueous solution of ε-caprolactam with a concentration of 50% by weight of ε-caprolactam. The temperature of the fluid is adjusted to 150° C. and the pressure is adjusted to 4.2 bar. During a residence time of 4.5 minutes in the underwater pelletizing system (2), cyclic dimers and oligomers are extracted from the pellets.

From here, the extracted pellets are fed by the fluid to the upper side of a vertical vessel (7) which serves for sedimentation. The vertical vessel (7) comprises a cylindrical section (8) and a conically shaped tapered bottom section (9) connected to a pipe (11) comprising a screw (10). The pressure and temperature in the cylindrical section (8) of the vertical vessel (7) is held at the same level as in the underwater pelletizing system (2). The hot pellets fall through the cylindrical section (8) and accumulate in the tapered bottom section (9). Together with residual fluid, they are fed from here outside the vertical vessel (7) by means of screw (10) through pipe (11).

By a pump in the conduit, the fluid may be recirculated to the underwater pelletizing system (2) from the outlets for fluid (12) being arranged at the top and bottom region of the cylindrical section (8). These outlets for fluid (12) are provided with sieves for avoiding that pellets are sucked into the conduit. A fraction of the fluid is withdrawn from circulation through the outlet for elutriation fluid (13) in order to avoid accumulation of extractables. The amount of fluid which has been withdrawn and the residual amounts of fluid leaving the vertical vessel with the pellets via the pipe (11) are replenished with fresh fluid. This can either be done by feeding an aqueous solution of ε-caprolactam with a suitable concentration into the circuit or, like shown in FIG. 3, by separately feeding fresh ε-caprolactam through the inlet for ε-caprolactam (14) and water through the inlet for water (15).

The tapered bottom section (9) of the vertical vessel (7) is equipped with sieves (16) as an option for withdrawing the fluid from it. Further, it is surrounded by an external cooling jacket (17) and inlets for a cooling liquid (18). Like shown in FIG. 3, through the inlet for an aqueous solution of ε-caprolactam (21) cold solution may also be pumped into the tapered bottom section (9) from above. In order to avoid turbulences, the solution is pumped slowly. It will sink down into the tapered bottom section (9) since its temperature is lower than that of the fluid in the cylindrical section (8) of the vertical vessel (7) and, hence, its density is higher.

Preferably, the cooling liquid for all of them is taken from a final wet extraction stage following the pre-extraction of cyclic dimers and oligomers and has a temperature of e.g. 100° C. Hence, it comprises an aqueous solution of ε-caprolactam like the fluid circulated between underwater pelletizing system (2) and vertical vessel (7), i.e. a single type of liquid is used throughout the whole process. If a lower temperature is required for cooling the pellets, the liquid from the final wet extraction stage can additionally be diluted with cold water to adjust the appropriate coolant temperature. As can be seen in FIG. 3, the cooling liquid used in the external cooling jacket (17) can in such a case be fed into the circuit between underwater pelletizing system (2) and vertical vessel (7).

The pellets falling into the cooled tapered bottom section (9) are quickly cooled to the temperature of the surrounding liquid. In the short time needed for the pellets to fall through the cylindrical section (8) practically no measurable further extraction occurs. In this case, the pellet level (20) is adjusted approximately at the upper end of the tapered bottom section (9).

Pipe (11) is provided with a cooling jacket (19) for further cooling of the pellets on their way to a further processing (6), which is a final wet extraction in this case, and for increasing the pressure tightness of the screw (10).

Figure 4:
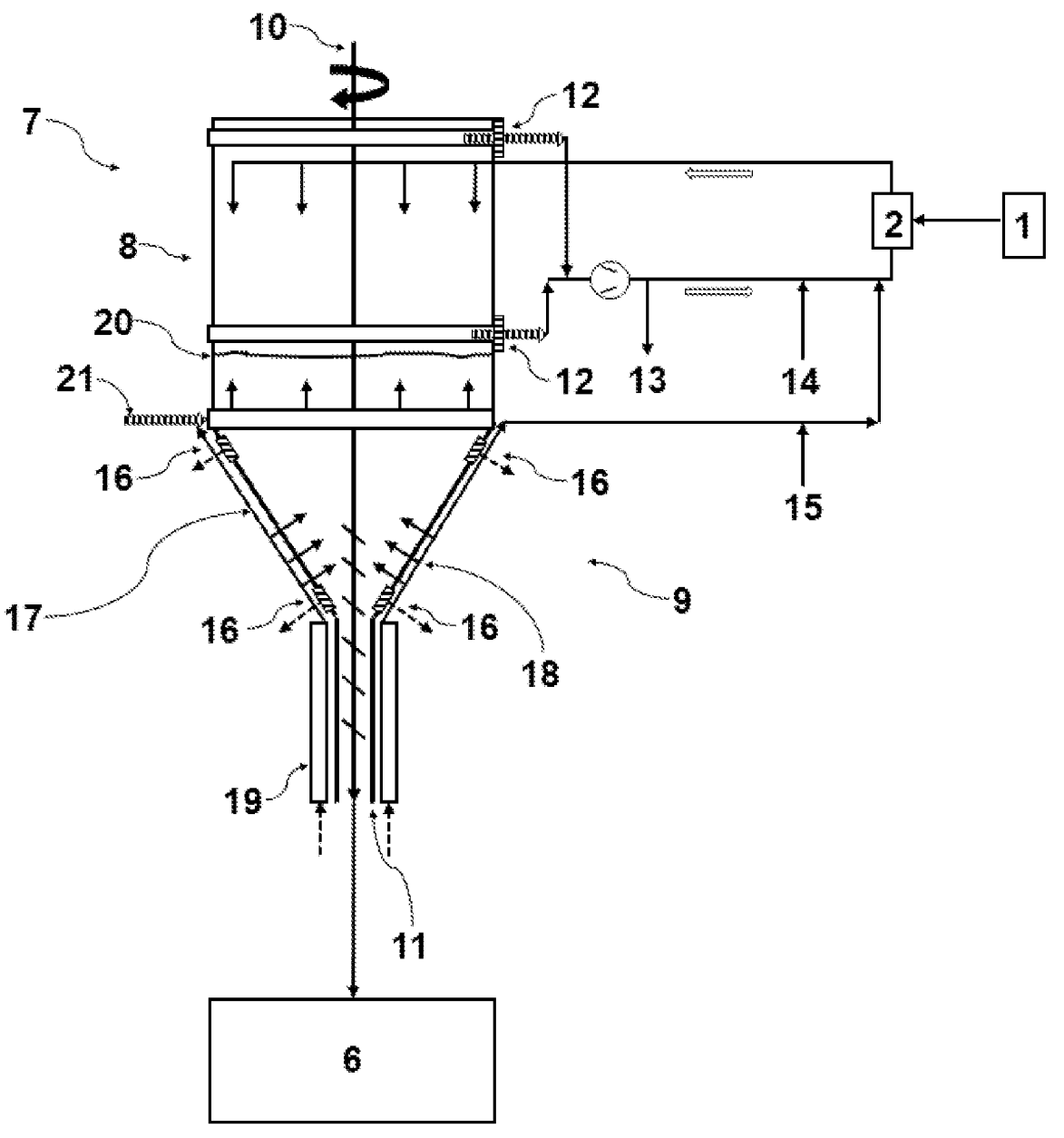
FIG. 4 shows a scheme of a process and device according to the invention with a further extraction option.

In FIG. 4, the option of a further oligomer extraction within the cylindrical section (8) of vertical vessel (7) is shown. The process and device are essentially the same as in FIG. 3 with the following differences.

The cutting chamber in the underwater pelletizing system (2) is supplied with a fluid comprising an aqueous solution of ε-caprolactam with a concentration of 60% by weight of ε-caprolactam. The temperature of the fluid is adjusted to 160° C. and the pressure is adjusted to 5.1 bar. The residence time in the underwater pelletizing system (2) is 2 minutes.

As opposed to FIG. 3, through the inlet for an aqueous solution of ε-caprolactam (21) no cold solution is pumped into vertical vessel (7) but a solution having a temperature above that of the liquid in the tapered bottom section (9) and up to the temperature used in the underwater pelletizing system (2), preferably at a temperature between 140° C. and 160° C. By this, a temperature gradient with three zones is created in vertical vessel (7): A cold zone within the tapered bottom section (9), a hot zone in the upper part of the cylindrical section (8), and an intermediate zone in-between them. The pellet level (20) is located above the tapered bottom section (9) in this option. The residence time of the pellets between the higher pellet level (20) as used in this embodiment and the lower pellet level (20) as used in FIG. 3 is between 10 min and 30 min. Further extraction takes only place during this residence time spent in the intermediate zone.

Figure 5:
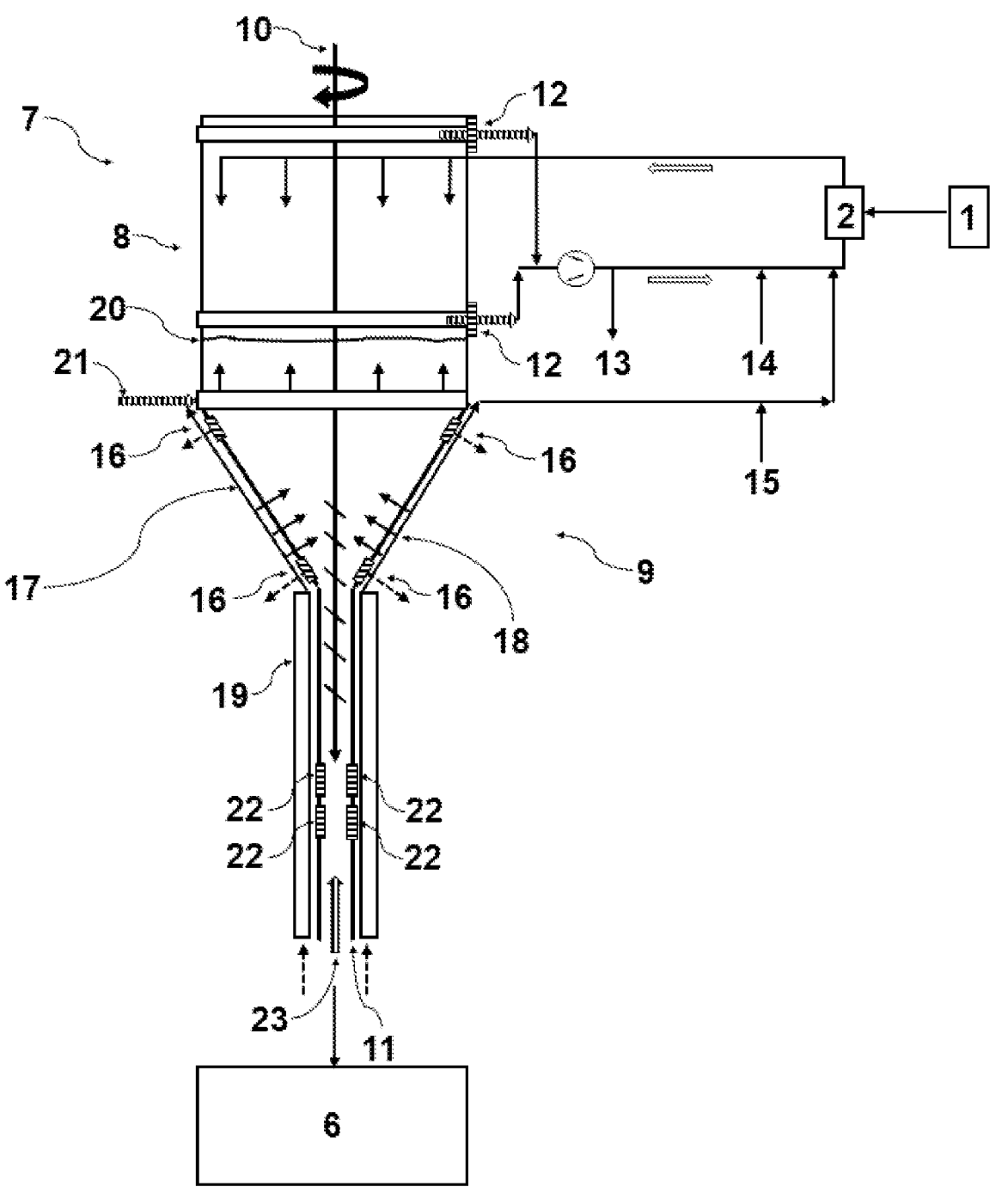
FIG. 5 shows a scheme of a process and device according to the invention with a cleansing option for the pellets.

FIG. 5 shows an embodiment where the vertical vessel (7) is not directly connected to a wet extraction as further processing (6), but the pellets are prepared for alternative further processes, such as a vacuum extraction, an extraction with superheated steam, or an extraction with inert gas. The pellets must be discharged and dried by a centrifugal dryer before such a further processing (6). Depending on the specific boundary conditions of further processing (6), even further drying steps may be necessary before further processing.

The process and device are essentially the same as in FIG. 4 with the following differences.

The cutting chamber in the underwater pelletizing system (2) is supplied with a fluid comprising an aqueous solution of ε-caprolactam with a concentration of 70% by weight of ε-caprolactam. The temperature of the fluid is adjusted to 170° C. and the pressure is adjusted to 5.9 bar. The residence time in the underwater pelletizing system (2) is 1 minute.

Pipe (11) is designed longer than in FIG. 4 and the screw (10) does not extend through its full length. The pipe (11) is equipped with sieves (22) in the area below the screw (10). Cold water is pumped by means for pumping water (23) counter currently to the pellets into the pipe (11) and withdrawn through sieves (22) for removing ε-caprolactam adhering to the surface of the pellets. The means for pumping water (23) may either be a pump or simply an injection nozzle which is connected with a device of one of the further processing steps which produce water at an elevated pressure.

Here, too, it must be ensured that no pellets can break through from top to bottom of the pipe (11). In this respect, more intensive cooling of the pipe (11) is of great importance in order to support the sealing downwards via the gelatinous structure of the ε-caprolactam/water mixture in the peripheral area.

LIST OF REFERENCE SIGNS

1 VK tube
2 underwater pelletizing system
3 dryer
4 pre-extraction stage for cyclic dimers
5 extraction stage
6 further processing
7 vertical vessel
8 cylindrical section
9 tapered bottom section
10 screw
11 pipe
12 outlet for fluid
13 outlet for elutriation fluid
14 inlet for ε-caprolactam
15 inlet for water
16 sieve
17 external cooling jacket
18 inlet for a cooling liquid
19 cooling jacket
20 pellet level
21 inlet for an aqueous solution of ε-caprolactam
22 sieve
23 means for pumping water

The invention claimed is:
1. A method for the production of polyamide 6 pellets, the method comprising:
  a) providing a melt of polyamide 6;
  b) feeding the melt into an underwater pelletizing system being operated with a fluid and producing pellets from the melt;
  c) transporting the pellets from the underwater pelletizing system with the fluid into an upper side of a vertical vessel having a cylindrical section and a tapered bottom section connected to a pipe comprising a screw and/or a rotary gate valve for conveying the pellets;
  d) extracting of cyclic dimers and oligomers from the pellets;
  wherein
    the extracting takes place in the underwater pelletizing system,
    after sedimentation by gravity into the tapered bottom section of the vertical vessel, the pellets together with residual amounts of the fluid are conveyed by the screw and/or the rotary gate valve through the pipe from the vertical vessel;

the fluid in the underwater pelletizing system and the vertical vessel comprises an aqueous solution of ε-caprolactam, the fluid in the underwater pelletizing system is held at a temperature between $T_g + X \cdot (T_m - T_g)$ and $y \cdot T_m$, wherein $T_g$ and $T_m$ are a glass transition temperature and a melting temperature of the polyamide 6, x=0.5-0.8 and y=0.95-1.0, the tapered bottom section of the vertical vessel is cooled, a pressure between 4 bar and 12 bar is maintained in the underwater pelletizing system and the vertical vessel, and the fluid is circulated between the underwater pelletizing system and the vertical vessel wherein a fraction of the fluid is withdrawn from circulation and the residual amounts of fluid leaving the vertical vessel with the pellets via the pipe and the withdrawn fraction are of the fluid is replenished with a fresh fluid.

2. The method of claim 1, further comprising feeding the extracted pellets into a further processing.

3. The method of claim 2, wherein the further processing comprises drying, extraction of ε-caprolactam and oligomers, and/or solid state polymerization/polycondensation.

4. The method of claim 1, wherein the cooling of the tapered bottom section of the vertical vessel is effected by an external cooling jacket and/or injecting a cooling liquid.

5. The method of claim 4, wherein the cooling liquid which has been injected in the tapered bottom section of the vertical vessel is also withdrawn from the tapered bottom section of the vertical vessel.

6. The method of claim 4, wherein the cooling liquid is selected from the group consisting of water, an aqueous solution of ε-caprolactam, and ε-caprolactam.

7. The method of claim 1, wherein the extracting is continued in the vertical vessel.

8. The method of claim 7, further comprising, introducing an aqueous solution of ε-caprolactam into a lower part of the cylindrical section of the vertical vessel at a temperature above that of the fluid in the tapered bottom section of the vertical vessel and up to the temperature used in the underwater pelletizing system thereby creating a temperature gradient in the vertical vessel.

9. The method of claim 1, wherein a residence time in the underwater pelletizing system is ≤5 min.

10. The method of claim 1, wherein the aqueous solution of e-caprolactam comprises an ε-caprolactam content of between 40% by weight and 80% by weight.

11. The method of claim 1, wherein in the underwater pelletizing system a weight ratio of the fluid to the pellets of between 1:1 and 3:1 is used.

12. The method of claim 1, wherein the pipe is at least partially cooled.

13. The method of claim 12, wherein the pipe is cooled to a temperature of between 5° C. and 100° C.

14. The method of claim 1, wherein water and/or caprolactam is dosed into the fluid between the vertical vessel and the underwater pelletizing system for maintaining a constant concentration of the fluid.

15. The method of claim 1, wherein the screw does not extend through a full length of the pipe and water is pumped counter currently to the pellets into the pipe and withdrawn at a point below the screw.

16. The method of claim 1, wherein e-caprolactam or an aqueous solution of ε-caprolactam is mixed into the melt before entering the underwater pelletizing system.

* * * * *